Sept. 9, 1924.                     W. J. CARROLL                     1,508,051
ADJUSTABLE COMBINATION GOLF BAG AND LUGGAGE CARRIER FOR AUTOMOBILES
Filed Dec. 18, 1923
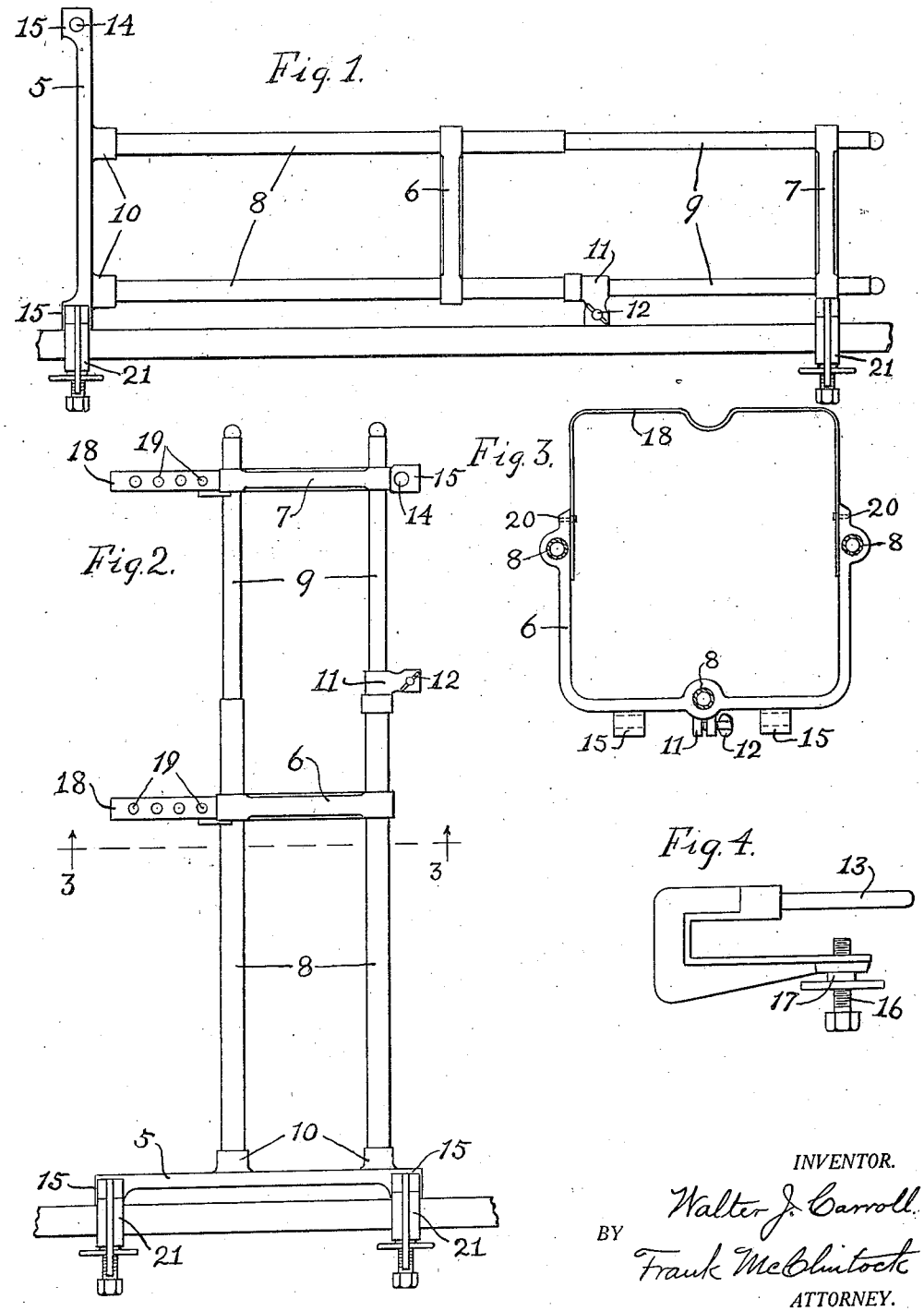
INVENTOR.
Walter J. Carroll
BY Frank McClintock
ATTORNEY.

Patented Sept. 9, 1924.

1,508,051

UNITED STATES PATENT OFFICE.

WALTER J. CARROLL, OF DETROIT, MICHIGAN.

ADJUSTABLE COMBINATION GOLF BAG AND LUGGAGE CARRIER FOR AUTOMOBILES.

Application filed December 18, 1923. Serial No. 681,424.

*To all whom it may concern:*

Be it known that I, WALTER J. CARROLL, a citizen of the United States, residing at Detroit, in the county of Wayne, in the State of Michigan, have invented a new and useful Improvement in Adjustable Combination Golf Bag and Luggage Carriers for Automobiles, of which the following is a specification.

My invention relates to an adjustable combination golf bag and luggage carriers which may be quickly and readily secured to and removed from the running board of an automobile.

The objects of my improvement are to provide a luggage carrier which may have its holding capacity readily varied, and to provide means whereby the carrier may be strongly clamped to the running board of any automobile in either a horizontal or vertical position as may be desired.

I attain these objects by means of the mechanism shown in the accompanying sheet of drawings, in which—

Figure 1 is a side view of the carrier secured in a horizontal position to the running board of an automobile.

Figure 2 is a view showing the carrier secured in a vertical position to the running board of an automobile.

Figure 3 is an enlarged sectional view, on the line 3, 3 of Figure 2, showing more clearly the construction of the adjustable bands for retaining the pieces of luggage within the carrier.

Figure 4 is an enlarged side view of one of the clamps for securing the carrier to the automobile running board.

Similar reference numerals refer to similar parts in each of the views.

The main frame of the carrier comprises an end or base plate 5, and two U shaped frames 6 and 7, to which are secured the main tubes 8 and the extension tubes or rods 9. The main tubes 8 are securely fastened at one end to the base plate by having their ends pressed into holes drilled in the lugs 10. The U shaped central frame 6 has holes drilled therein, corresponding in location with those in the base plate 5, which is securely pressed onto the free ends of the main tubes 8 to substantially the position shown. The tubes 8 are thus kept parallel at all times. The three extension tubes or rods 9 are securely fastened to their outer U shaped frame 7 in the same relative position as the main tubes 8 so that their free ends may be inserted into the open ends of said tubes 8 and are of such size that they may slide freely longitudinally therein.

A slotted clamp 11 is secured to the free end of one of the main tubes 8 and is provided with a wing nut 12 whereby the extension tube or rod 9 may be securely clamped thus preventing any longitudinal movement while thus locked.

The construction of the clamps used for securing the carrier to the running board of an automobile in either a horizontal or a vertical position, is clearly shown in Figure 4. The distance between the two arms of the clamps is sufficient to allow it to slip freely on the running board. The projecting rod 13 fits closely in the holes 14 in each of the foot rests 15. A set screw 16 is provided to hold the upper arm of the clamp tightly against the upper surface of running board. A lock nut 17 prevents the set screw from being loosened by vibration. Two of the clamps are required, both being inserted in the proper holes in the base plate when the carrier is used in a vertical position shown in Figure 2. When it is desired to use it in the horizontal position shown in Figure 1, one of the clamps is transferred to the foot rest 15 which is part of the outer U shaped frame 7.

For the purpose of retaining and securely holding golf clubs and other desired articles within the carrier, when carried in a vertical position as shown in Figure 2. The adjustable bands or spring strips 18 are provided one for each of the U shaped frames 6 and 7. The free arms of these bands 18 are provided with a series of holes 19. Pins 20 securely fastened near the free ends of the U shaped supports 6 and 7 are adapted to enter the holes 19 and thus hold the strips in the desired position to hold the contents of the carrier tightly. When the carrier is used in a horizontal position as shown in Figure 1 these adjustable spring strips may be reversed then they will fit closely within the U shaped frames.

What I claim as my invention is:

1. In a luggage carrier, the combination with base plate having tubes secured thereto, of a U shaped frame having tubes or rods secured thereto and adapted to move longitudinally within the base plate tubes means for locking the movable section in any desired position, supporting feet provided with suitable holes located on the base plate and on the outer U shaped frame and clamps provided with an extension rod fitting in the holes provided in the supporting feet.

2. In a luggage carrier the combination of a base plate, U shaped frames, tubes or rods connecting said base plate with the U shaped frames, U shaped bands fitting within the U shaped frames and provided with a series of holes, and pins secured to the free ends of said U shaped frames.

WALTER J. CARROLL.